(12) United States Patent
Tomioka

(10) Patent No.: US 6,906,509 B2
(45) Date of Patent: Jun. 14, 2005

(54) ROTOR FOR ROTATION SENSOR

(75) Inventor: Masanori Tomioka, Okayama (JP)

(73) Assignee: Uchiyama Manufacturing Corp., Okayama (JP)

( * ) Notice: Subject to any disclaimer, the term of this patent is extended or adjusted under 35 U.S.C. 154(b) by 0 days.

(21) Appl. No.: 10/485,271

(22) PCT Filed: Jul. 29, 2002

(86) PCT No.: PCT/JP02/07663

§ 371 (c)(1),
(2), (4) Date: Jan. 30, 2004

(87) PCT Pub. No.: WO03/012456

PCT Pub. Date: Feb. 13, 2003

(65) Prior Publication Data

US 2004/0174160 A1 Sep. 9, 2004

(30) Foreign Application Priority Data

Jul. 30, 2001 (JP) ........................................ 2001-229299

(51) Int. Cl.$^7$ ................................................ G01P 3/44
(52) U.S. Cl. ................................... 324/174; 324/207.25
(58) Field of Search ................................ 324/173–174, 324/207.11, 207.2, 207.21, 207.25; 384/448; 73/514.39

(56) References Cited

U.S. PATENT DOCUMENTS

| | | | |
|---|---|---|---|
| 5,325,055 A | | 6/1994 | Geringer |
| 6,003,375 A | * | 12/1999 | Ouchi et al. ............. 73/514.39 |
| 6,043,643 A | * | 3/2000 | Message et al. ........... 324/174 |
| 2002/0140418 A1 | * | 10/2002 | Ichiman ..................... 324/174 |

* cited by examiner

*Primary Examiner*—Bot Ledynh
(74) *Attorney, Agent, or Firm*—Wenderoth, Lind & Ponack, L.L.P.

(57) ABSTRACT

A rotor for a rotation sensor mounted on a bearing unit for a wheel on an automotive vehicle used to detect the number of revolutions of the wheel includes a reinforcing ring (2) secured to a radially outside rotational part or element of the bearing unit. A cylindrical multi-pole magnet (3) extends in the axial direction and is arranged on the radial outside of the reinforcing ring (2). A nonmagnetic cover ring (4) is arranged on the radial outside of the cylindrical multi-pole magnet (3) and covers the radial outer surface of the cylindrical multi-pole magnet (3).

11 Claims, 4 Drawing Sheets

ROTOR FOR ROTATION SENSOR

TECHNICAL FIELD

The present invention relates to the construction of a rotation detecting device that may be mounted on an automotive vehicle's wheel bearing unit that includes two elements rotating relative to each other. More particularly, the present invention relates to a rotor for the rotation sensor that may be used in conjunction with the anti-lock braking system (ABS) and/or traction control system (TCS) installed on the automotive vehicle in order to detect the number of revolutions for each of the four wheels, such as front, rear, right and left wheels.

BACKGROUND ART

A typical conventional rotation detecting device that is mounted on each of the automotive vehicle wheels so that it can detect the number of revolutions for each of the four wheels, thereby preventing any difference in the revolutions from occurring between each of the wheels has the following construction. That is, the device includes a rotor for the rotation sensor that may be mounted on the rotational part or element of the bearing unit, and a pulse sensor that responds to pulses that are generated by the rotor for the rotation sensor. The rotor for the rotation sensor that provides the function of the pulse generating rotor includes a reinforcing ring having an L-shape cross section. The reinforcing ring has a cylindrical portion that may be fitted and secured to the circumferential surface of the rotational part or element of the bearing unit and a ring portion bent radially from the end edge of said cylindrical portion. A pulse generator means in the form of a multi-pole magnet is arranged on the outer axial side of the ring portion of the reinforcing ring. The pulse sensor is arranged in proximity of the pulse generator means, and may be located axially outside the pulse generator means so that the pulse sensor can respond to the pulses from the pulse generator means. The construction described above is an example that has been developed and used for practical purposes.

In the above construction of the rotation detecting device, in most cases, the reinforcing ring further includes a seal lip formed on the end thereof for providing the sealing function. This construction will be described below in further detail by referring to the appropriate figure.

A typical example of the conventional construction is shown in FIG. 7, and is now described. As shown in FIG. 7, a reinforcing ring 103 has a cylindrical portion 104 fitted and secured to the circumferential surface of the rotational part or element (which corresponds to the outer race 101 in the example shown in FIG. 7) of the bearing unit. The reinforcing ring 103 has a ring portion 105 bent radially from the end edge of the cylindrical portion 104, and a pulse generator ring 106, that has the function of the pulse generator means in the form of a multi-pole magnet, is fastened to the outer axial side of the ring portion 105. A rotation detecting sensor 108 is arranged in proximity of the pulse generator ring 106, and is located axially outside the pulse generator ring 106.

More specifically, the reinforcing ring 103 is formed to have an L-shape cross section, including the cylindrical portion 104 and the ring portion 105 bent radially from the end edge of the cylindrical portion 104, wherein it further includes a seal lip 107 formed on the end thereof as shown in FIG. 7 so that the seal lip 107 can make sliding contact with the circumferential surface of the inner race 102 of the bearing unit. The seal lip 107 may provide the sealing functions that protect the bearing unit comprised of the outer race 101 and inner race 102 against any possible entry of water or foreign matter from the outside.

It may be seen from FIG. 7 that in the conventional rotation detecting device including the rotor for the rotation sensor or pulse generating rotor, the pulse generator ring 106 is arranged in proximity of the rotation detecting sensor, and is therefore located on the outermost side of the device that is exposed to the atmosphere. Thus, the pulse generator ring 106 is always placed under the unfavorable conditions in which it is directly exposed to any splashing water or foreign matter. If any water enters, it may cause rust to gather and it would have the adverse effect on the sensing ability of the rotation detecting sensor 108 to detect the number of revolutions. In even worse situations, any foreign solids might be deposited on some parts of the pulse generator ring 106 and rotation detecting sensor 108. If any foreign solids were to deposit on and enter between the pulse generator ring 106 and the rotation detecting sensor 108, the pulse generator ring 106 might bite the foreign solids, which would cause physical damage to the pulse generator ring 106. This would appear as a serious problem for the conventional rotation detecting device since it would disable the device from detecting the number of revolutions accurately.

SUMMARY OF THE INVENTION

In light of the problems associated with the rotor for the rotation sensor in the conventional rotation detecting device that has been described above, it is an object of the present invention to provide a rotor for the rotation sensor that provides a good sealing capability for a pulse generating section and also provides a drastically enhanced sensing capability and mechanical durability.

In order to solve the above problems, the present invention proposes to provide a rotor for a rotation sensor that may be mounted on a bearing unit for each of the wheels on an automotive vehicle so that it can detect the number of revolutions for the wheel. The rotor for the rotation sensor includes a reinforcing ring secured to the radial outside of the rotational part or element of the bearing unit. A cylindrical multi-pole magnet extends in the axial direction and is arranged on the radial outside of the reinforcing ring, and a nonmagnetic cover ring is arranged on the radial outside of the multi-pole magnet and covers the radial outer surface of the multi-pole magnet.

The cylindrical multi-pole magnet may take the form of any encoder that is known to the relevant art. For example, the cylindrical multi-pole magnet may be obtained by providing a mixture composed of any of the ferromagnetic materials and any of the elastic elements such as synthetic rubber, synthetic resins and the like, molding the mixture into a cylindrical shape by using a vulcanized molding process, and magnetizing it so that S polarity and N polarity can appear alternately in the circumferential direction of the cylindrical shape The cylindrical multi-pole magnet may be disposed on the outer radial side of the reinforcing ring in the following manner. That is, the mixture on which the cylindrical multi-pole magnet is based may be molded into the cylindrical shape by using the vulcanized molding process, and it is then attached to the outer radial side of the reinforcing ring by means of the adhesive medium. As an alternative, the reinforcing ring may have a preliminary foundation treatment on its outer radial side, a coating of adhesive may be applied to the outer radial side, and then the rubber material containing the added ferromagnetic materials and on which the cylindrical multi-pole magnet is based may be attached to the outer radial side of the reinforcing ring, while at the same time it is being molded into the cylindrical shape by using the vulcanized molding process.

Preferably, the cylindrical shape thus obtained should be magnetized before the nonmagnetic cover ring is arranged on the outer radial side of the a cylindrical multi-pole magnet. In this way, the cylindrical shape can be magnetized such that S polarity and N polarity can appear powerfully and discretely in the circumferential direction thereof. It should be noted, however, that the magnetization can be performed after the cover ring is disposed as described above, because the cover ring is made of the nonmagnetic materials. In this way, the process of manufacturing the rotor for the rotation sensor in accordance with the present invention can advantageously be simplified.

In accordance with the present invention, the component parts of the rotor for the rotation sensor such as the reinforcing ring, cylindrical multi-pole magnet and cover ring may be provided separately. Then, the rotor for the rotation sensor may be completed by firstly magnetizing the cylindrical multi-pole magnet, followed then by bonding the magnetized multi-pole magnet to the outer radial side of the reinforcing ring, and finally mounting the cover ring over the reinforcing ring and cylindrical multi-pole magnet from the outer circumference. Alternatively, the rotor for the rotation sensor may be completed by firstly bonding the unmagnetized cylindrical multi-pole magnet to the outer radial side of the reinforcing ring, followed then by mounting the cover ring over the reinforcing ring and cylindrical multi-pole magnet, and finally magnetizing the cylindrical multi-pole magnet. Furthermore, the rotor for the rotation sensor may be completed by obtaining the unmagnetized multi-pole magnet by using the vulcanized molding process so that it can be formed together with the reinforcing ring and bonded to the reinforcing ring, magnetizing the multi-pole magnet, and then mounting the cover ring over the reinforcing ring and magnetized multi-pole magnet, or by mounting the cover ring over the reinforcing ring and unmagnetized cylindrical multi-pole magnet, and then magnetizing the cylindrical multi-pole magnet. The rotor for the rotation sensor may be completed by using any of the above described procedures that is determined to meet the particular situations and/or needs.

In the above description, the elastic elements, such as synthetic rubbers or synthetic resins, which may be used with the present invention include polymers such as NBR (acrylonytrile butadiene rubber), ACM (acryl acid ester copolymer), and H-NBR (hydrogen-added acrylonytrile butadiene rubber).

The ferromagnetic materials that may be admixed with the elastic elements include strontium ferrite, barium ferrite, and a combination of the strontium ferrite and barium ferrite, all of which are provided in powdery forms.

Any of the ferromagnetic materials in their powdery forms may be added tot any of the polymers mentioned above, preferably with the composition ratio of 70% to 98% by weight, and the resulting mixture may be admixed with any of the rubber chemicals.

The rotor for the rotation sensor having the construction described above may be mounted on the bearing unit for each of the automotive vehicle wheels such that the cylindrical multi-pole magnet may be located on the outer radial side of the rotational part or element of the bearing unit. As the cylindrical multi-pole magnet has its outer radial side covered by the cover ring, it can be protected against any possible entry of splashing water or foreign matter by the cover ring that isolates the magnet from the atmosphere outside it. Some possible situations, such as rust gathering on some component parts or elements if they are affected by splashing water, foreign solids deposited on some component parts or elements if they are exposed to such foreign solids, or some component parts or elements being damaged by foreign solids if they bite such foreign solids, can thus be avoided.

As the cover ring is made of any nonmagnetic material, it can allow the magnetic lines of force from the multi-pole magnet to be transmitted through the cover ring. Thus, the multi-pole magnet can retain its pulse generating performance.

In the rotor for the rotation sensor that has been described above, as for the construction that a non magnetic cover ring is arranged on the outer radial side of the cylindrical multi-pole magnet and covers the outer radial surface of the cylindrical multi-pole magnet, it can adopt the following construction where the cover ring covers the cylindrical multi-pole magnet by clasping the cylindrical multi-pole magnet from the outer radial side thereof.

By clasping the multi-pole magnet by the cover ring in this way, the multi-pole magnet can be isolated from the outside by the cover ring so that it cannot be exposed to the outside. This ensures that the multi-pole magnet can be protected against any solids such as stones, sand or dust, or liquids such as water, that are coming from the outside. Thus, any possible physical wear or damage that might be caused by such solids or liquids can be avoided, and the multi-pole magnet can be expected to provide accurate pulses almost permanently without causing any mechanical and functional problems.

As for the before described construction where the cover ring covers the cylindrical multi-pole magnet by clasping the cylindrical multi-pole magnet from the outer radial side thereof, it can adopt some different ways or forms, as described below.

In a first form, the cylindrical multi-pole magnet is clasped by the cover ring by swaging the cover ring against the cylindrical multi-pole magnet.

In a second form, the cylindrical multi-pole magnet is clasped by the cover ring by bonding the cover ring to the cylindrical magnet by means of any adhesive medium.

In any of the above forms, the cylindrical multi-pole magnet and cover ring can be united into one unit, and the multi-pole magnet can thus be protected more effectively against any possible unfavorable influences from the outside.

In a third form, the cylindrical multi-pole magnet is clasped by the cover ring by pressing the cover ring into the reinforcing ring having the cylindrical multi-pole magnet arranged on the reinforcing ring in the axial direction thereof, thereby engaging the outer circumferential surface of the cylindrical multi-pole magnet with the inner circumferential surface of the cover ring.

In a fourth form that-corresponds to a variation of the third form, the cylindrical multi-pole magnet further includes an elastic projection on the outer radial side thereof. The elastic projection extends beyond the inner circumferential surface of the cover ring, and the elastic projection has a forward end that is elastically deformed and engages with the inner circumferential surface of the cover ring by pressing the cover ring into the reinforcing ring, having the cylindrical multi-pole magnet arranged on the reinforcing ring in the axial direction thereof, and thereby the cylindrical multi-pole magnet is clasped by the cover ring.

When the cover ring is provided to clasp the cylindrical multi-pole magnet according to the third and fourth forms, the cover ring can be arranged on the outer radial side of the cylindrical multi-pole magnet so that it can cover the outer radial side of the cylindrical multi-pole magnet by simply pressing the cover ring in the axial direction against the reinforcing ring having the cylindrical multi-pole magnet on its outer radial side.

In the fourth form, the cylindrical multi-pole magnet may be formed to include a plurality of elastic projections on its outer radial side so that they can be arranged at regular intervals in the circumferential direction. Preferably, three or more such elastic projections should be provided at equal intervals.

In the rotor for the rotation sensor in accordance with any of the forms described above, the cover ring may be provided so that it can be fitted and secured to the outer radial side of the rotational part or element of the bearing unit.

In the embodiment shown in FIG. 2, for example, the cover ring may be provided to cover the outer radial side of the cylindrical multi-pole magnet by allowing the portion extending axially outwardly (located on the right side in FIG. 2) to be fitted and secured to the outer radial side of the rotational part or element of the bearing unit and by allowing the portion extending axially inwardly (located on the left side in FIG. 2) to be arranged on the outer radial side of the cylindrical multi-pole magnet.

In this example, the cover ring may be arranged on the outer radial side of the cylindrical multi-pole magnet so that it can cover the outer radial side of the cylindrical multi-pole magnet by simply pressing the cover ring in the axial direction into the reinforcing ring. This is advantageous in that the cover ring can be arranged properly and without causing any misalignment.

In the embodiment shown in FIG. 2, it may be seen that there is a gap between the outer radial side of the cylindrical multi-pole magnet and the inner radial side of the cover ring. According to this embodiment, the cover ring can also be arranged on the outer radial side of the cylindrical multi-pole magnet so that it can cover the outer radial side of the cylindrical multi-pole magnet. Thus, the cylindrical multi-pole magnet can be isolated from the outside by the cover ring, and can be protected against any possible unfavorable influences from the outside.

Although this is not shown, the cylindrical multi-pole magnet may be protected more completely against any possible influences from the outside by adopting the embodiment described in the before described first through fourth forms into the portion of the cover ring that extends axially inwardly (located on the left side in FIG. 2) in FIG. 2 to clasp the cylindrical multi-pole magnet as described in the first through fourth forms while maintaining the construction and form of the other portion of the cover ring shown in FIG. 2. For example, in the embodiment shown in FIG. 2 in which the portion extending axially outwardly (located on the right side in FIG. 2) is secured to the outer radial side of the rotational part or element of the bearing unit, the embodiments described in the before described third and fourth forms, where the cylindrical multi-pole magnet is clasped by the cover ring and conducted between the outer radial side of the cylindrical multi-pole magnet and the inner radial side of the cover ring, are provided by the portion extending axially inwardly (located on the left side in FIG. 2) by pressing the cover ring in the axial direction into the reinforcing ring. Alternatively, the embodiments described in the before described second and first forms, where the cylindrical multi-pole magnet is clasped by the cover ring between the outer radial side of the cylindrical multi-pole magnet and the inner radial side of the cover ring, are provided by the portion extending axially inwardly (located on the left side in FIG. 2) by bonding the outer radial side of the cylindrical multi-pole magnet with the inner radial side of the the cover ring during the process that the cover ring is pressed in the axial direction into the reinforcing ring, or by swaging the portion extending axially inwardly (located on the left side end in FIG. 2) of the cover ring after the cover ring has been pressed in the axial direction into the reinforcing ring.

In the rotor for the rotation sensor according to any of the embodiments described above, the cover ring may have a thickness of between 0.1 mm and 1.0 mm.

The cover ring that is comparatively less thick as shown above allows the magnetic lines of force to be transmitted therethrough, and can be formed into any shape. Also, the cover ring can be swaged accurately and easily at the axial inner side end thereof (located on the left side end in FIG. 4).

As the cover ring must be made of any of the nonmagnetic materials that permit magnetism to be transmitted therethrough and must also meet the performance requirements described above, the cover ring may be based on any of the materials, such as SUS304, Al (aluminum), CuZn, Cu and the like.

In accordance with the present invention, the cylindrical multi-pole magnet, which generates magnetic pulses that represent the number of revolutions, is normally located in an area exposed to the atmosphere outside it, but is completely isolated from the outside by the nonmagnetic cover ring that covers the radial outer side of the cylindrical multi-pole magnet. Thus, the rotation sensor can be protected against any possible entry of foreign solids, lubricating oils and the like from the outside, or can be protected against any possible damages caused by such foreign solids and the like. This provides a stable magnetic field environment that allows the sensor to detect the magnetic pulses from the magnet accurately and reliably.

When the rotor for the rotation sensor is placed in such a stable magnetic field environment, the rotation detecting sensor is expected to perform excellent sensing functions, and can provide high-precision output.

Although the cylindrical multi-pole magnet is made of any of the elastic elements as described above, it can be protected by the cover ring against any possible wear. As the cylindrical multi-pole magnet is embraced firmly by the cover ring from the outside, there is no risk of the cylindrical multi-pole magnet slipping out of the cover ring or being misaligned. Thus, it is guaranteed that the cylindrical multi-pole magnet can be operating properly for an extended period of time.

BEST MODES OF EMBODYING THE INVENTION

Several preferred embodiments of the present invention are now described below by referring to the accompanying drawings.

Although the component parts or elements of the rotor for the rotation sensor that are described below in accordance with the preferred embodiments of the present invention may have some particular forms or shapes and some particular positional relationships, it should be understood that those forms or shapes and positional relationships are only given by way of examples and schematically in such a manner as to enable any persons skilled in the relevant art to understand the present invention. It should also be understood that those component parts or elements may be made of any materials or may have the dimensional requirements, although some particular materials or dimensional requirements are shown and described according to the preferred embodiments of the present invention. It should be understood, therefore, that the present invention is not limited to the embodiments that are described below and shown in the accompanying drawings, and various changes or modifications may be made to those embodiments without departing from the spirit and scope of the invention as defined in the appended claims.

(Embodiment 1)

In the first embodiment that is now described, a rubber blank that is still in its unvulcanized state is first prepared. This rubber blank may be composed of NBR (acrylonytrile butadiene rubber) as well as any of ferrite powders (such as strontium ferrite powder) and any rubber chemical that are admixed with NBR. The strontium ferrite powder should preferably have a composition ratio of 80% by weight.

A reinforcing ring 2 that is made of any metal is then provided. The reinforcing ring 2 may have a preliminary foundation treatment on an outer radial side thereof, and a coating of adhesive medium may be applied to the outer radial side of the reinforcing ring 2. Within a mold, the rubber blank may then be molded into a cylindrical shape by the vulcanization process so that it can be bonded to the outer radial side of the reinforcing ring 2.

A SUS304 plate of 0.5 mm thickness may be formed into a cover ring 4 having a ring shape. Then, the cover ring 4 may be pressed in the axial direction of the reinforcing ring 2 (horizontal direction in FIG. 1) onto the reinforcing ring 2 having the vulcanized rubber bonded to the outer radial side thereof so that the cover ring 4 can thus be temporarily mounted.

Figure 1:
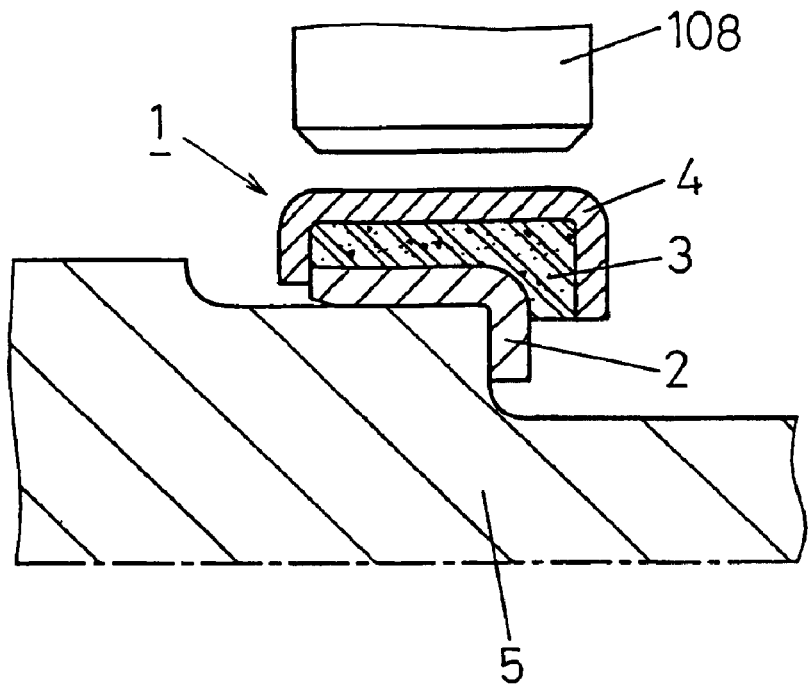
FIG. 1 is a cross sectional view illustrating how a rotor for a rotation sensor according to one preferred embodiment of the present invention may be mounted on a rotational element of a bearing unit, although some non-essential parts or elements are not shown.

Then, the cover ring 4 may have its opposite ends (located on the left and right sides in FIG. 1) deformed radially inwardly (downwardly as viewed in FIG. 1) by swaging the ends as shown in FIG. 1.

Then, the cylindrical multi-pole magnet 3 may be magnetized through the cover ring 4 so that N polarity and S polarity can appear alternately in the circumferential direction of the cylindrical multi-pole magnet 3. Finally, the rotor 1 for the rotation sensor according to the present invention may be completed.

The cover ring 4 may have its axial right-side end previously formed as shown in FIG. 1, and the cover ring 4 and the cylindrical multi-pole magnet 3 may then be united into one unit by swaging the cover ring 4 so that it can only have its left side end deformed radially inwardly. Thus, this can simplify the manufacturing process.

The rotor 1 for the rotation sensor that has thus been completed may be used as a vehicle wheel rotation detecting device, and may be fitted and secured to the rotational part or element of the bearing unit, such as to a drive shaft 5 in the case of FIG. 1, so that a rotation detect sensor 108 can be located in proximity of the cylindrical multi-pole magnet 3 and radially outside the cylindrical multi-pole magnet 3.

(Embodiment 2)

In the second embodiment that is now described, a rubber blank that is still in its unvulcanized state is first prepared. This rubber blank may be composed of H-NBR (hydrogen-added acrylonytrile butadiene rubber) as well as any of ferrite powders (a mixture of strontium ferrite and barium ferrite both in powdery forms) and any rubber chemical that are admixed with H-NBR. The ferrite powder should preferably have a composition ratio of 85% by weight.

A reinforcing ring 12 that is made of any metal is then provided. The reinforcing ring 12 may have the preliminary foundation treatment on the outer radial side thereof, and a coating of adhesive medium may be applied to the outer radial side of the reinforcing ring 12. Within a mold, the rubber blank may then be molded into a cylindrical shape by the vulcanization process so that it can be bonded to the outer radial side of the reinforcing ring 12.

The rubber blank thus obtained and containing the ferrite powder and rubber chemical may be magnetized so that N polarity and S polarity can appear alternately in the circumferential direction of the rubber blank. The cylindrical multi-pole magnet 13 is thus obtained, and may be arranged on the outer radial side of the reinforcing ring 12.

A SUS304 plate of 0.6 mm thickness may be formed into a cover ring 14 having the ring shape. The cover ring 14 may be formed to include a cylindrical portion 14a on the axial outer side (located on the right side in FIG. 2), a ring portion 14b extending from the axial inner side end of the cylindrical portion 14a and beyond the radial outer side of the same, and a cylindrical portion 14c extending from the radial outer side end of the ring portion 14b toward the axial inner side of the same.

Figure 2:
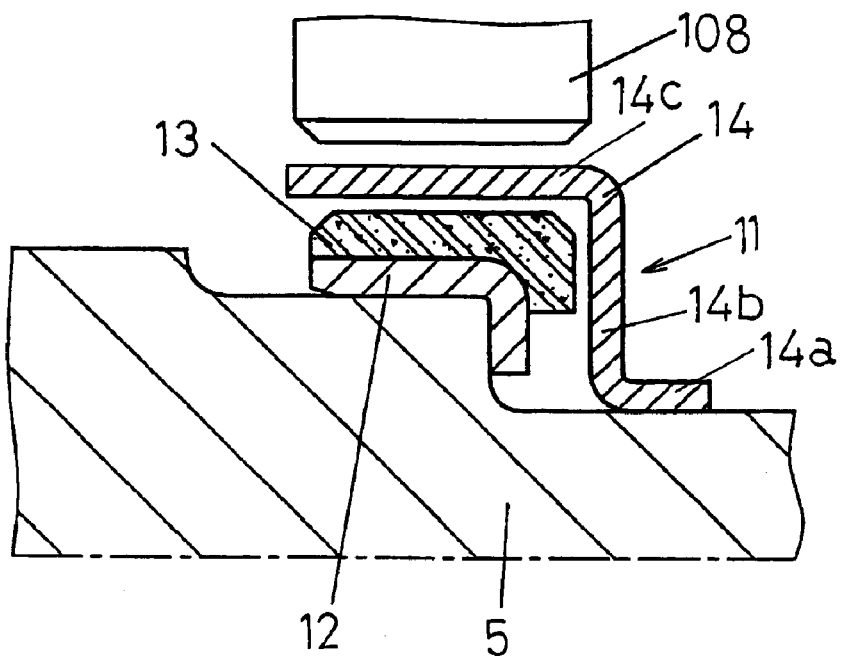
FIG. 2 is a cross sectional view illustrating how the rotor for the rotation sensor according to another preferred embodiment of the present invention may be mounted on the rotational element of the bearing unit, although some non-essential parts or elements are not shown.

The reinforcing ring 12 having the cylindrical multi-pole magnet arranged on the outer radial side thereof may be fitted and secured to the rotational part or element of the bearing unit, such as to the drive shaft 5 in the case of FIG. 2. Then, the cover ring 14 may be fitted and secured to the drive shaft 5. The rotor 11 for the rotation sensor may thus be completed. In this rotor 11 for the rotation sensor, the cover ring 14 is arranged on the outer radial side of the multi-pole magnet 13 so that the multi-pole magnet 13 may have its outer radial side covered by the ring portion 14b and cylindrical portion 14c of the cover ring 14.

It may be seen from FIG. 2 that a rotation detect sensor 108 is disposed from the outer radial side of the cylindrical multi-pole magnet 13 in the rotor 11 for the rotation sensor so that it can be located in proximity of the cylindrical multi-pole magnet 13. Thus, the rotor for the rotation sensor may be used as a wheel rotation detect device.

(Embodiment 3)

Figure 3:
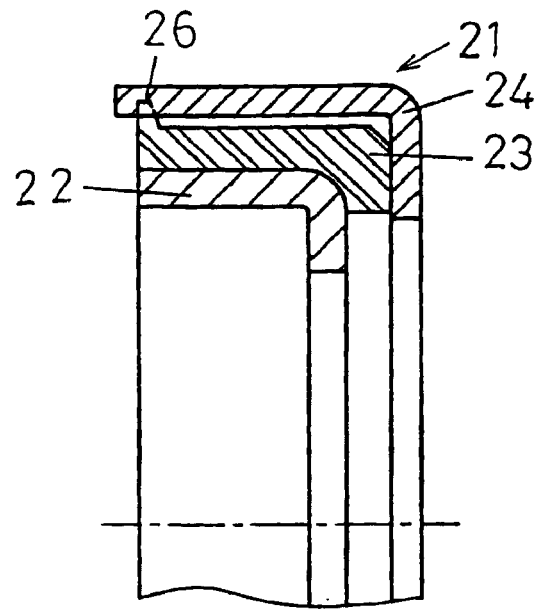
FIG. 3 is a cross sectional view illustrating the rotor for the rotation sensor according to still another preferred embodiment of the present invention, although some non-essential parts or elements are not shown.

A rotor 21 for a rotation sensor according to the third embodiment that is now described by referring to FIG. 3 represents a variation of the preceding embodiments that have been described, wherein a cover ring 24 may be provided to clasp a cylindrical multi-pole magnet 23 from the outer radial side thereof.

A reinforcing ring 22 that is made of any metal is provided, and the cylindrical multi-pole magnet 23 that has been magnetized so that N polarity and S polarity can appear alternately in the circumferential direction thereof may be bonded to the outer radial side of the reinforcing ring 22 during the vulcanized molding process. The cylindrical multi-pole magnet 23 may be molded so that it can include an elastic projection 26 on the outer radial side thereof, the elastic projection 26 extending from the inner radial side of the cover ring and beyond the outer radial side of the same (located on the upper side in FIG. 3). Although this is not shown, the cylindrical multi-pole magnet 23 may be formed so that it can include three elastic projections 26 provided at equal intervals on the outer radial side of the cylindrical multi-pole magnet 23.

Then the cover ring 24 may be pressed in the axial direction (in the horizontal direction in FIG. 3) onto the reinforcing ring 22 having the cylindrical multi-pole magnet 23 thus arranged on the outer radial side of the reinforcing ring 22.

As the elastic projection 26 is provided so that it can extend beyond the inner circumferential surface of the cover ring 24 and toward the outer radial side (located on the upper side in FIG. 3) of the cover ring 24, its forward end may become elastically deformed by pressing the cover ring 24 so that the forward end can press against the inner circumferential surface of the cover ring 24. The rotor 21 for the rotation sensor according to the present invention can thus be completed.

In accordance with the present invention, it should be noted that the rotor 21 for the rotation sensor may also be completed by firstly fitting and securing the reinforcing ring 22 having the cylindrical multi-pole magnet 23 arranged on its outer radial side to the rotational part or element of the bearing unit, such as to the drive shaft, and by then pressing the cover ring 24 in the axial direction (in the horizontal direction as viewed in FIG. 3).

According to the embodiment shown in FIG. 3, in any way, the inner radial side surface of the cover ring 24 may be made to engage the outer radial side surface of the cylindrical multi-pole magnet 23 simply by deforming the forward end of the elastic projection 26, with the most part of the outer surface of the cylindrical multi-pole magnet 24 being left untouched. Even when the cover ring 24 is mounted on the cylindrical multi-pole magnet 23 after it is magnetized, the most part of its outer surface can retain its original shape, and N polarity and S polarity can appear alternately at the regular pitches. Thus, the cylindrical multi-pole magnet 23 can provide pulses that represent the accurate number of revolutions.

In the embodiment shown in FIG. 3, the outer axial side end (located on the left side in FIG. 3) of the cover ring 24 has an inner diameter that is substantially the same as that of the outer axial side end (located on the right side in FIG. 3) of the cylindrical multi-pole magnet 23. As a variation of the embodiment shown in FIG. 3, the cover ring 24 may be provided so that the inner diameter side of its axial outer side end (located on the right side in FIG. 3) can be extended further in the direction of the inner diameter, and similarly to the embodiment shown in FIG. 2, the cover ring 24 may be provided so that its outer axial side end can be fitted and secured to the rotational part or element of the bearing unit, such as to the drive shaft, as is the case with the reinforcing ring 22.

The remaining parts or elements of the rotor 21 for the rotation sensor other than the parts or elements that have been described in connection with the third embodiment are similar to those in the preceding embodiments 1 and 2. Any further description of those parts or elements will be omitted to avoid the duplication.

(Embodiment 4)

Figure 4:
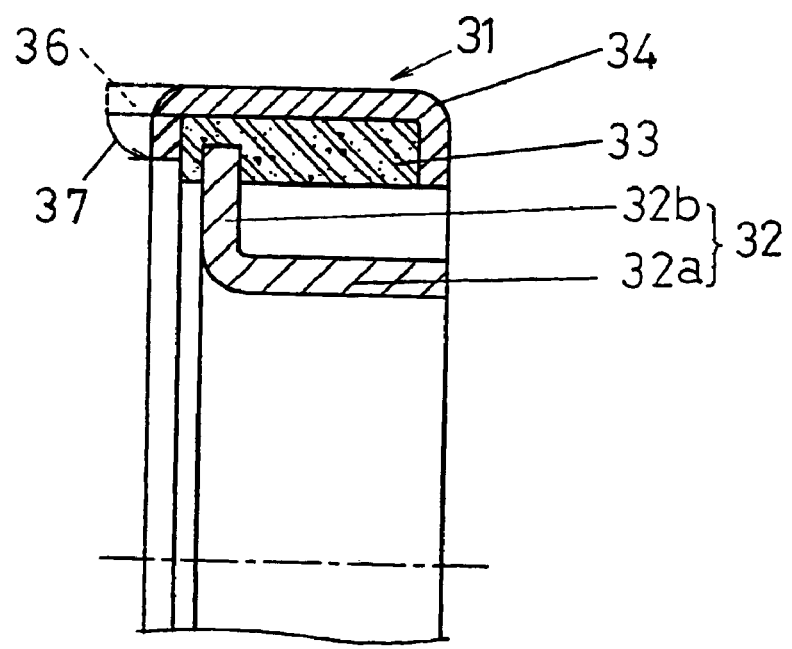
FIG. 4 is a cross sectional view illustrating the rotor for the rotation sensor according to a further preferred embodiment of the present invention, although some non-essential parts or elements are not shown.
Figure 5:
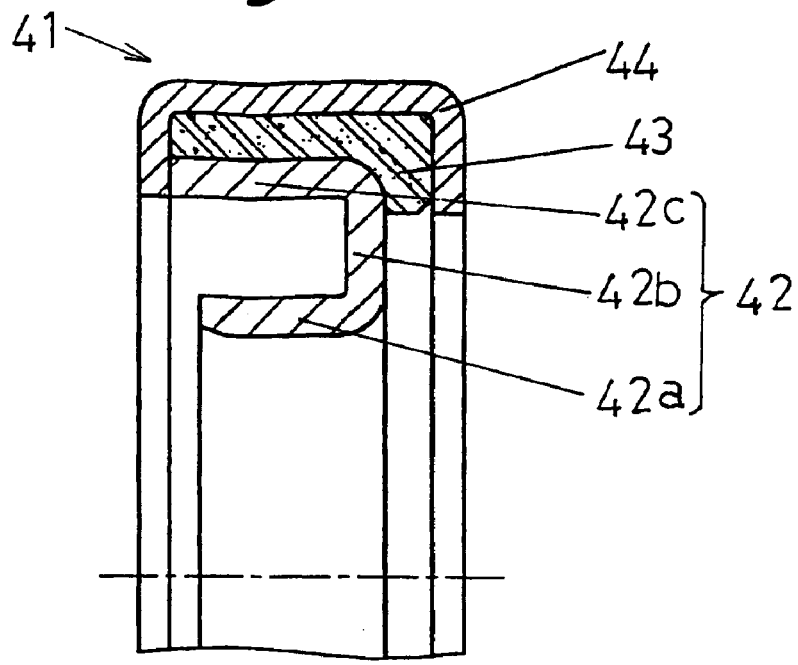
FIG. 5 is a cross sectional view illustrating the rotor for the rotation sensor according to another preferred embodiment of the present invention, although some non-essential parts or elements are not shown.

Each of the embodiments shown in FIGS. 4 and 5 represents a variation of the preceding embodiments that have been described so far, wherein some design considerations are included, that is, the rotor for the rotation sensor is specifically designed to permit it to be fitted and secured to the rotational part or element of the bearing unit, such as to the drive shaft, or the cylindrical multi-pole magnet is designed to permit it to have an enlarged effective area.

Specifically, in the embodiment shown in FIG. 4, a reinforcing ring 32 is formed to include a cylindrical portion 32a that is to be fitted and secured to the radial outer side of the rotational part or element of the bearing unit, such as to the outer radial side of the drive shaft, and a ring portion 32b extending from the end of the cylindrical portion 32a toward the outer radial side of the same.

A cylindrical multi-pole magnet 33 may be molded by the vulcanized molding process so that it can be bonded to the reinforcing ring 32, and may also be extended in the axial direction (in the horizontal direction as viewed in FIG. 4) at the outer radial side of the ring portion 32b of the reinforcing ring 32.

Thus, the cylindrical multi-pole magnet 33 may be located on the outer radial side and more remotely from the rotational part or element of the bearing unit, such as the drive shaft. In this way, the rotor for the rotation sensor can be fitted and secured more easily and firmly, and the cylindrical multi-pole magnet can be formed to have the enlarged effective area.

It may be understood from the above description that the cover ring 34 and cylindrical multi-pole magnet 33 may be united into one unit by swaging the cover ring 34 after the cover ring 34 is temporarily mounted to cover the outermost circumference of the cylindrical multi-pole magnet 33 in such a manner that the axial left side end 36 of the cover ring 34 may be deformed radially inwardly as indicated by an arrow 37.

In the embodiment shown in FIG. 5, a reinforcing ring 42 may be formed to include a cylindrical portion 42a that is to be fitted and secured to the outer radial side of the rotational part or element of the bearing unit, such as to the outer radial side of the drive shaft, a ring portion 42b extending from the end of the cylindrical portion 42a toward outer radial side, and cylindrical portion 42c extending from the outer radial side of the ring portion 42b in the axial direction.

A cylindrical multi-pole magnet 43 may be molded by the vulcanized molding process so that it can be bonded to the reinforcing ring 42, and may be arranged on the outer radial side of the cylindrical portion 42c of the reinforcing ring 42.

Then, a cover ring 44 may be arranged on the outer radial side of the cylindrical multi-pole magnet 43.

Thus, the cylindrical multi-pole magnet 43 may be located on the outer radial side and more remotely from the rotational part or element of the bearing unit, such as from the drive shaft. In this way, the rotor for the rotation sensor can be fitted and secured more easily and firmly, and the cylindrical multi-pole magnet can be formed to have the enlarged effective area.

The remaining parts or elements of rotors 31, 41 for the rotation sensor other than the parts or elements that have been described in connection with the fourth embodiment are similar to those in the preceding embodiments 1 and 2. Any further description of those parts or elements will be omitted to avoid the duplication.

(Embodiment 5)

Figure 6:
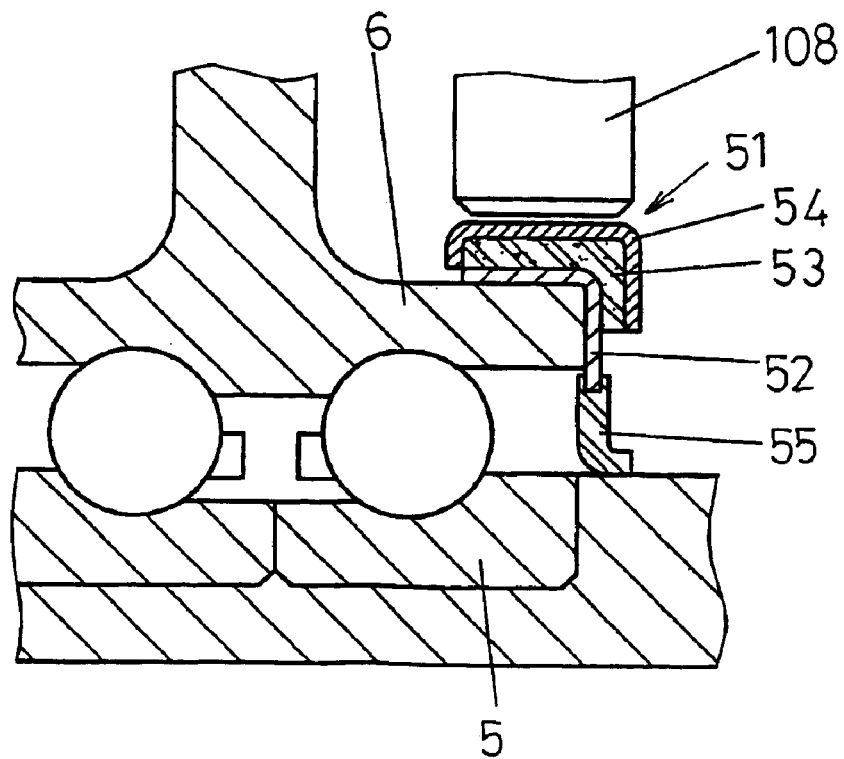
FIG. 6 is a cross sectional view illustrating how the rotor for the rotation sensor according to any of the preferred embodiments of the present invention may be mounted in a different way on the rotational part or element of the bearing unit, although some non-essential parts or elements are not shown.
Figure 7:
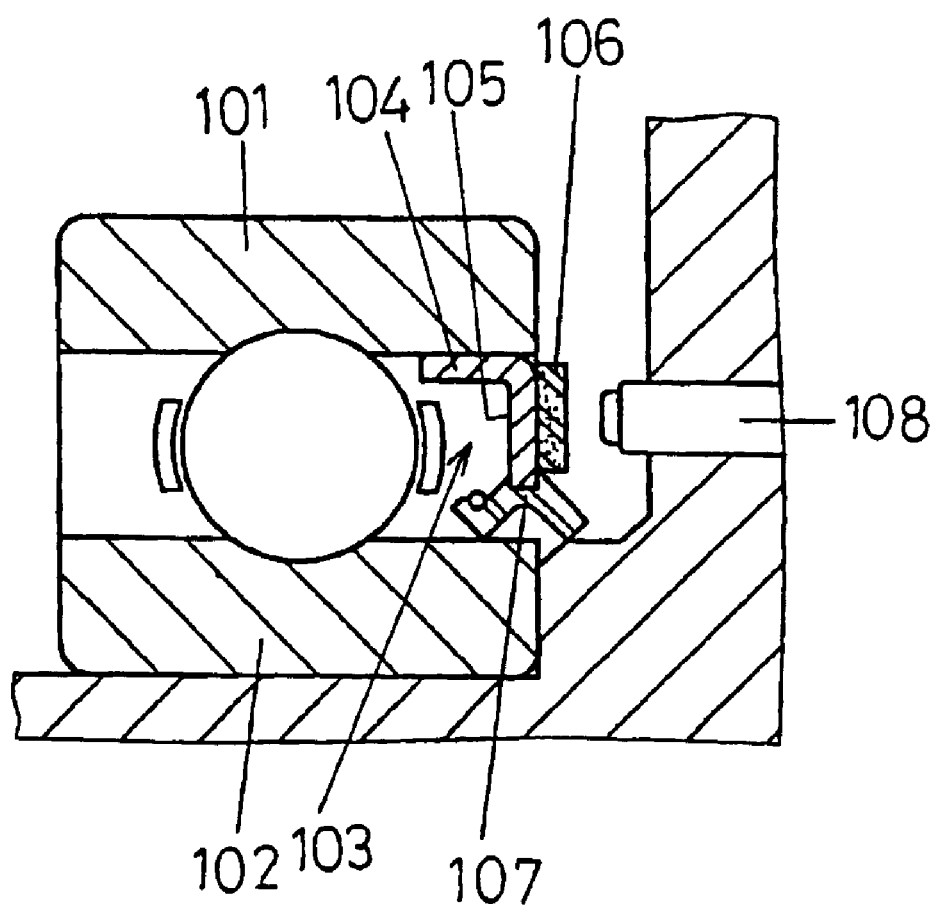
FIG. 7 is a cross sectional view illustrating how a typical rotor for a rotation sensor according to the prior art may be mounted on the rotational part or element of the bearing unit, although some non-essential parts or elements are not shown.

The rotor for the rotation sensor according to any of the first and second embodiments described above may be fitted and secured to the inner race of the bearing unit, or specifically to the drive shaft 5, while the rotor for the rotation sensor 51 according to the fifth embodiment shown in FIG. 6 may be fitted and secured to the outer circumferential surface of the outer race 6 of the bearing unit.

In the embodiment shown in FIG. 6, a cylindrical multi-pole magnet 53 also has its outer radial side covered by a cover ring 54, and may be located even in those worst areas that are exposed to mud, water and the like.

When the bearing unit including the inner race 5 and outer race 6 is to be sealed, the reinforcing ring 52 or cover ring 54 may be formed to include a seal lip that can make sliding contact with the outer radial side of the inner race 5 of the bearing unit. In the embodiment shown in FIG. 6, the reinforcing ring 52 may be formed to include a seal lip 55 that can make sliding contact with the outer radial side of the inner race 5 of the bearing unit.

Although this is not shown, if the reinforcing ring includes a flanged portion in proximity of the seal lip, the bearing unit can be sealed by allowing the seal lip to make sliding contact with the lateral side of the flanged portion.

The remaining parts or elements of the rotor 51 for the rotation sensor other than the parts or elements that have been described in connection with the fifth embodiment are similar to those in the preceding embodiments 1 and 2. Any further description of those parts or elements will be omitted to avoid duplication.

The present invention provides the rotor for the rotation sensor that may be mounted on each of the four wheels, such as front, rear, left and right wheels, on the automotive vehicle so that it can detect the number of revolutions for each wheel, wherein the rotor for the rotation is designed so that the pulse generating section can be protected more securely, and is also designed to provide a drastically enhanced sensing capability and mechanical durability.

What is claimed is:

1. A rotor for a rotation sensor mounted on a bearing unit for a wheel on an automotive vehicle and used to detect the number of revolutions of the wheel, including:

a reinforcing ring secured to a radially outside rotational part or element of the bearing unit;

a cylindrical multi-pole magnet extending in an axial direction and arranged on a radially outside part of said reinforcing ring, said cylindrical multi-pole magnet having a radially inner surface on said radially outside part of said reinforcing ring and a radially outer surface; and a nonmagnetic cover ring arranged radially outside of said cylindrical multi-pole magnet and covering all of said radially outer surface of said cylindrical multi-pole magnet.

2. The rotor of claim 1, wherein said cover ring covers said cylindrical multi-pole magnet by clasping said cylindrical multi-pole magnet from radially outside thereof.

3. The rotor of claim 2, wherein said cover ring is swaged against said cylindrical multi-pole magnet.

4. The rotor of claim 2, wherein said cover ring is bonded to said cylindrical multi-pole magnet.

5. The rotor of claim 2, wherein said outer surface of said cylindrical multi-pole magnet is engaged with an inner circumferential surface of said cover ring by said cover ring being pressed onto said reinforcing ring with said cylindrical multi-pole magnet thereon in an axial direction thereof.

6. The rotor of claim 2, wherein said cylindrical multi-pole magnet further comprises an elastic projection on a radially outer side thereof, said elastic projection extending beyond an inner circumferential surface of said cover ring, said elastic projection having a forward end that is deformed elastically and engaged with said inner circumferential surface of said cover ring when said cover ring is pressed onto said reinforcing ring in an axial direction thereof.

7. The rotor of claim 1, wherein said cover ring is secured to the radially outside rotational part or element of the bearing unit.

8. The rotor of claim 1, wherein said cover ring has a thickness between 0.1 mm and 1.0 mm.

9. A rotor for a rotation sensor mounted on a bearing unit for a wheel on an automotive vehicle and used to detect the number of revolutions of the wheel, including:

a reinforcing ring secured to a radially outside rotational part or element of the bearing unit;

a cylindrical multi-pole magnet extending in an axial direction and arranged on a radially outside part of said reinforcing ring, said cylindrical multi-pole magnet having axial ends, a radially inner surface on said radially outside part of said reinforcing ring and a radially outer surface; and a nonmagnetic cover ring arranged radially outside of said cylindrical multi-pole magnet and extending at least between said axial ends of said cylindrical multi-pole magnet so as to cover all of said radially outer surface of said cylindrical multi-pole magnet between said axial ends of said cylindrical multi-pole magnet.

10. The rotor of claim 9, wherein said cover ring is in direct contact with said radially outer surface of said cylindrical multi-pole magnet.

11. The rotor of claim 9, wherein said cover ring is spaced from said radially outer surface of said cylindrical multi-pole magnet.

* * * * *